United States Patent
Decker et al.

[11] Patent Number: 6,161,637
[45] Date of Patent: Dec. 19, 2000

[54] TWIN STICK CONTROL SYSTEM

[75] Inventors: Matthew J Decker, Lakeville; Edric C. Funk, Blaine; Michael R. Stuber, Burnsville, all of Minn.

[73] Assignee: The Toro Company, Minneapolis, Minn.

[21] Appl. No.: 09/129,560

[22] Filed: Aug. 5, 1998

[51] Int. Cl.$^7$ .................................................. B62D 11/04
[52] U.S. Cl. ................ 180/6.48; 180/332; 180/333; 74/526
[58] Field of Search ............................. 180/170, 322, 180/335, 336, 6.32, 6.48, 6.36, 334, 333, 332; 74/526, 480 B, 522.5, 525, 528, 522, 527, 480 R, 473.26, 473.25; 56/11.4, 10.8

[56] References Cited

U.S. PATENT DOCUMENTS

| | | |
|---|---|---|
| 3,459,273 | 8/1969 | Leinhauser . |
| 3,605,519 | 9/1971 | Heggen ................................ 74/480 R |
| 3,702,051 | 11/1972 | Deines . |
| 4,036,321 | 7/1977 | Habiger ................................ 180/6.48 |
| 4,078,449 | 3/1978 | Kelly ..................................... 74/527 |
| 4,490,710 | 12/1984 | Kopsho, Jr. et al. ............ 74/526 X |
| 4,589,249 | 5/1986 | Walker et al. . |
| 4,955,249 | 9/1990 | Wetor ................................. 74/526 X |
| 5,062,316 | 11/1991 | Lykken et al. .................... 74/527 X |
| 5,205,181 | 4/1993 | Wright ............................... 74/480 R |
| 5,228,360 | 7/1993 | Johnson ............................. 74/526 X |
| 5,301,568 | 4/1994 | Kono ................................... 74/525 |
| 5,727,426 | 3/1998 | Lykken et al. ...................... 74/526 |
| 5,791,200 | 8/1998 | Papasideris ........................ 74/529 |

*Primary Examiner*—Lanna Mai
*Assistant Examiner*—Ruth Ilan
*Attorney, Agent, or Firm*—James W. Miller

[57] ABSTRACT

A twin stick control system for a movable unit such as a ZRT vehicle includes two control sticks placed side-by-side. Each control stick controls the operation of at least one drive wheel on each side of the vehicle. The control sticks are movable from their neutral position in a first range of motion without any interference from a spring restoring force tending to return them to neutral, thus allowing the control sticks to remain wherever the operator places them in the first range of motion. A cruise control system is located to abut against the control sticks at the conclusion of the first range of motion to define a cruise control speed setting. The sticks can still be advanced forwardly beyond the cruise control speed setting, but encounter a spring force when doing so which is directed to returning the sticks back to the cruise control speed setting.

19 Claims, 4 Drawing Sheets

TWIN STICK CONTROL SYSTEM

TECHNICAL FIELD

This invention relates to a control system for controlling the movement of a movable, self-propelled, outdoor power equipment unit. More particularly, this invention relates to a control system having twin control sticks for controlling the movement of a ZRT vehicle such as a riding mower.

BACKGROUND OF THE INVENTION

ZRT is an acronym which stands for Zero Radius Turn. When used in conjunction with a vehicle, ZRT means a vehicle having a very tight or sharp minimum turning radius. Vehicles such as riding mowers often desirably have ZRT capability due to the frequent and sharp turns needed to mow around trees, bushes and other obstructions. Accordingly, there have been many ZRT riding mowers.

Most ZRT riding mowers have a frame including at least one drive wheel on each side of the frame. The drive wheels on each side of the frame are independently powered so that one can be operated in a forward direction while the other is stopped or even operated in reverse. This is what provides ZRT capability. Operating one drive wheel on one side of the frame forwardly while simultaneously stopping or operating the drive wheel on the other side of the frame rearwardly causes the mower to spin about its center in a very sharp turn.

Many ZRT mowers have what is known as a twin stick control system. Two control sticks are provided side-by-side with each stick controlling one of the drive wheels. When the sticks are advanced together forwardly out of their neutral position, both drive wheels are operated forwardly to cause the mower to move forwardly. Steering is accomplished by advancing one stick more than the other. A ZRT type turn can be achieved by advancing one stick forwardly without advancing the other stick or even pulling back sharply on the other stick.

A cruise control lever is provided on some ZRT mowers for establishing a cruise control speed. The twin sticks of the control system are spring biased forwardly out of their neutral position and into contact with the cruise control lever. Thus, the operator of the mower can take his hands off the sticks and they will remain biased up against the cruise control lever to cause the vehicle to drive forwardly at whatever speed is determined by the position of the cruise control lever. To slow down or stop, the operator has to grab the control sticks and move them back away from the cruise control lever against the biasing force of the springs.

U.S. Pat. No. 3,459,273 to Leinhauser and U.S. Pat. No. 4,589,249 to Walker show twin stick control systems on ZRT vehicles with a cruise control lever against which the control sticks are biased.

One disadvantage with the above noted cruise control lever is that the mower cannot be temporarily accelerated out of its cruise speed without changing the position of the cruise control lever. Inherently, this loses the current cruise control setting, requiring that the operator try to reset the cruise control lever after the temporary acceleration is finished. The need to first move the cruise control lever to temporarily speed up and to then reset, or attempt to reset, the cruise control lever to its original position is cumbersome.

Moreover, having the control sticks biased up against a cruise control lever complicates the slight feathering motions of the sticks which are required to slightly adjust the direction of the mower. It is often the case that one control stick has to be momentarily feathered ahead of the other stick to steer the vehicle, but this cannot be done when both sticks abut against the cruise control lever. The second stick could be slightly and momentarily retarded instead of feathering the first stick in advance of the other stick. However, retarding the stick in this manner, against the bias of the spring forcing the stick forward, is not an obvious action, and, in fact, is the reverse of what most unskilled operators would expect to do. Accordingly, the known twin stick systems of this type having such a cruise control lever are difficult to use, particularly for an unskilled operator.

Some ZRT mowers have twin control sticks that are not biased forwardly against any type of cruise control lever. Some of these sticks are not biased at all, but simply remain at whatever position they are put in by the operator. Effectively, a cruise control speed can be set simply by advancing the control sticks to a desired position and leaving them there.

However, such a system has the same disadvantage as the earlier described system of not being able to temporarily accelerate the mower without losing the current setting of the sticks. The sticks can always be advanced to temporarily speed up, but doing so removes them from their initial position. The operator then has to try and reset them in that position to resume the original speed. However, there is nothing to guide the operator in where to reset the sticks and so regaining the original speed is difficult to do without hunting back and forth with the sticks until the speed seems right.

Another problem with this latter system is that there is no upper limit on the cruise control speed that can be set. The sticks could be pushed to their far forward position and left there. There is no way to set a cruise control speed that the operator cannot easily change.

SUMMARY OF THE INVENTION

One aspect of this invention relates to a control system for controlling the operation of a drive wheel of a movable unit. The control member is carried on the movable unit and is capable of being selectively manipulated by an operator. The control member has a neutral position in which the drive wheel is at rest. The control member is movable out of the neutral position in a first direction to cause the drive wheel to rotate in a forward direction to move the movable unit forwardly. The control member is movable in a first range of motion with the control member being configured to remain wherever it is placed by the operator within the first range of motion even when the operator releases the control member. The control member is movable in a second range of motion following the first range of motion, the movement of the control member in the second range of motion being opposed by a biasing device tending to return the control member towards a junction between the first and second ranges of motion. The junction between the first and second ranges of motion sets a cruise control speed to which the control member is automatically returned by the biasing device if the operator releases the control member within the second range of motion.

Another aspect of this invention comprises a control system in which a control stick is movably carried on the movable unit. The control stick is operably coupled to the drive wheel. An abutment is fixed to the control stick for movement therewith. A stop is movably carried on the movable unit and extends into the path of motion of the abutment on the control stick, the stop having an initial position that is spaced from the abutment when the control stick is in a neutral position with the drive wheel at rest. A spring is connected to the stop such that movement of the control stick forwardly from its neutral position is not initially opposed by the spring until the abutment engages the stop with continued movement of the control stick then serving to move the stop against the bias of the spring.

A final aspect of this invention relates to a cruise control system for a movable unit. The cruise control system comprises an adjustable cruise control member that abuts against a drive wheel control member of the movable unit when the drive wheel control member is at a cruise control speed setting that is established by the orientation of the cruise control member. The adjustment of the cruise control member is located within the movable unit in a location that is inaccessible to an operator of the movable unit while operating the movable unit to prevent the operator from changing the cruise control speed setting established by the orientation of the cruise control member.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
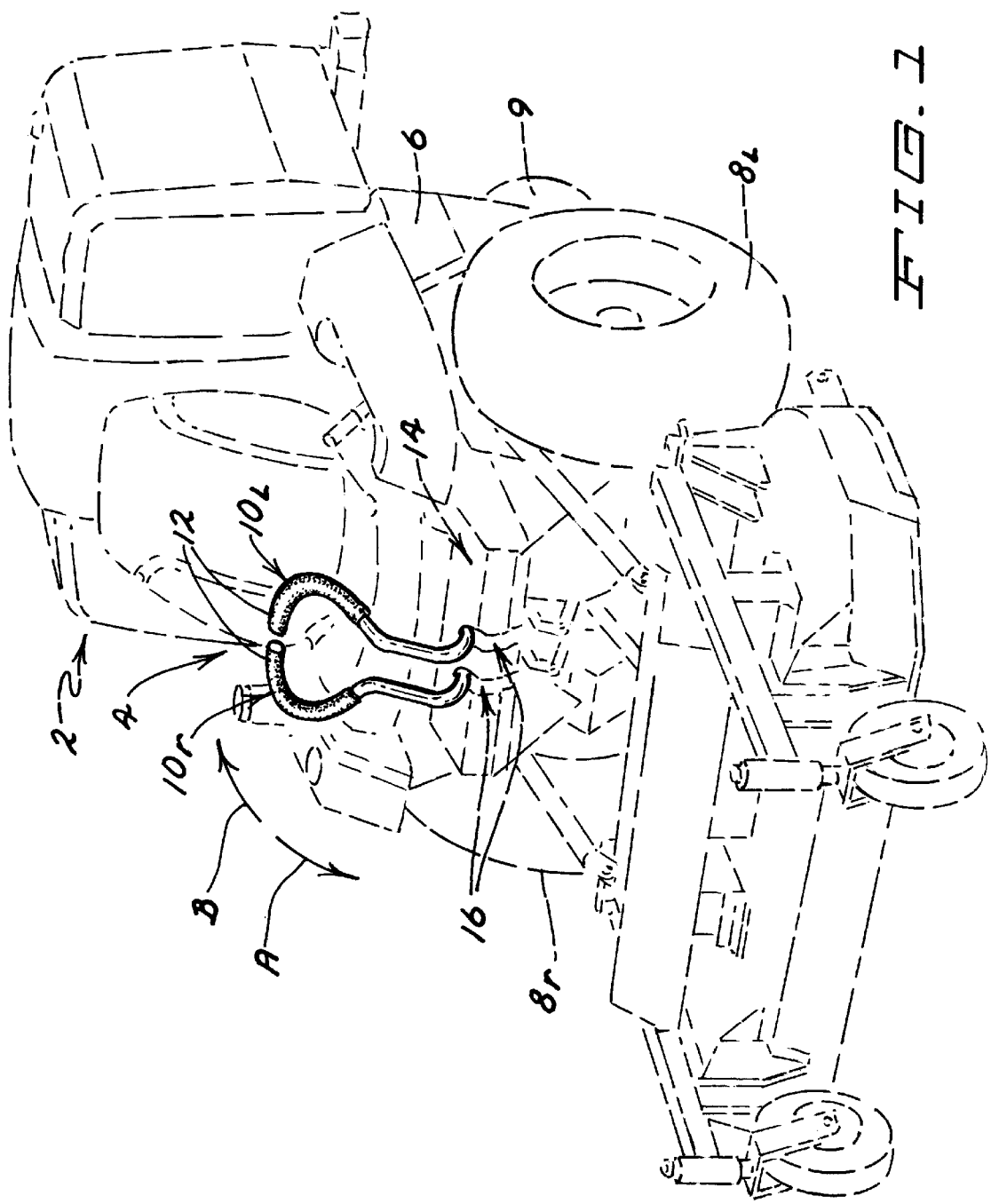
FIG. 1 is a perspective view of a ZRT vehicle, such as a riding mower, having a twin stick control system, the twin sticks being shown in solid and the remaining portions of the mower being shown in phantom.

Referring first to FIG. 1, a ZRT type vehicle comprising a riding lawn mower is generally shown as 2. While a mower 2 has been illustrated herein as comprising the ZRT vehicle, this invention, which is directed to a twin stick control system 4 for such a mower 2, is not limited to use with a mower 2 or even to an outdoor power equipment unit. Twin stick control system 4 of this invention could be used with any ZRT type vehicle.

By way of background, mower 2 includes a frame 6 that is supported for movement over the ground by a plurality of ground engaging wheels 8 and 9. At least one wheel on each side of mower 2 is a powered traction or drive wheel 8. Thus, mower 2 includes a left drive wheel $8_l$ and a right drive wheel $8_r$. Each drive wheel 8 is independently powered so that it can rotate independently of the other drive wheel 8. The independent drive to each drive wheel 8 could be a separate hydraulic drive motor coupled to each wheel 8 or a separate mechanical drive train or transmission coupled to each wheel 8. The purpose of twin stick control system 4 is to operate the independent drives to the left and right drive wheels $8_l$ and $8_r$.

The twin stick control system 4, as the name implies, has two control members in the form of levers or sticks 10 that are placed next to one another adjacent the operator's seat on mower 2. Each control stick 10 has an upper end 12 which can be gripped by one of the operator's hands. In fact, the upper ends 12 of sticks 10 are close enough together so that one of the operator's hands can overlie them both. Control sticks 10 extend downwardly into an interior portion of frame 6 beneath an access panel 14. As shown in FIG. 1, slots 16 are provided in panel 14 to accommodate the movement of control sticks 10.

The left control stick $10_l$ is operatively connected in any suitable fashion to left drive wheel $8_l$ of mower 2. Similarly, the right control stick $10_r$ is operatively connected to right drive wheel $8_r$ of mower 2. Drive wheels 8 and control sticks 10 will be referred to by the same reference numeral with an l or r subscript to refer to the left or right side of the vehicle with which it is associated. When the reference numeral is used without such subscript, that description is intended to apply equally to either the left or right side components. Thus, the following description of the structure and function of control system 4 will use reference numerals without subscripts due to the identical nature of the left and right side components, even though the reference numerals of the components in the drawings will be properly labelled with subscripts.

Each control stick 10 has a neutral position in which the corresponding drive wheel 8 is at rest. Control stick 10 can be moved forwardly in a first direction, as represented by the arrow A, out of such neutral position to cause the corresponding drive wheel 8 to rotate forwardly and move mower 2 forwardly. If control stick 10 is moved in an opposite direction, as represented by the arrow B, out of the neutral position, reverse operation of drive wheel 8, and hence of mower 2, is accomplished. When one control stick 8 is moved in the direction of arrow A and the other control stick 8 is moved in the direction of arrow B, a sharp ZRT type turn can be made. The manipulation of such control levers in a ZRT type mower to operate drive wheels 8 and steer mower 2 is well known to those skilled in the art.

Figure 2:
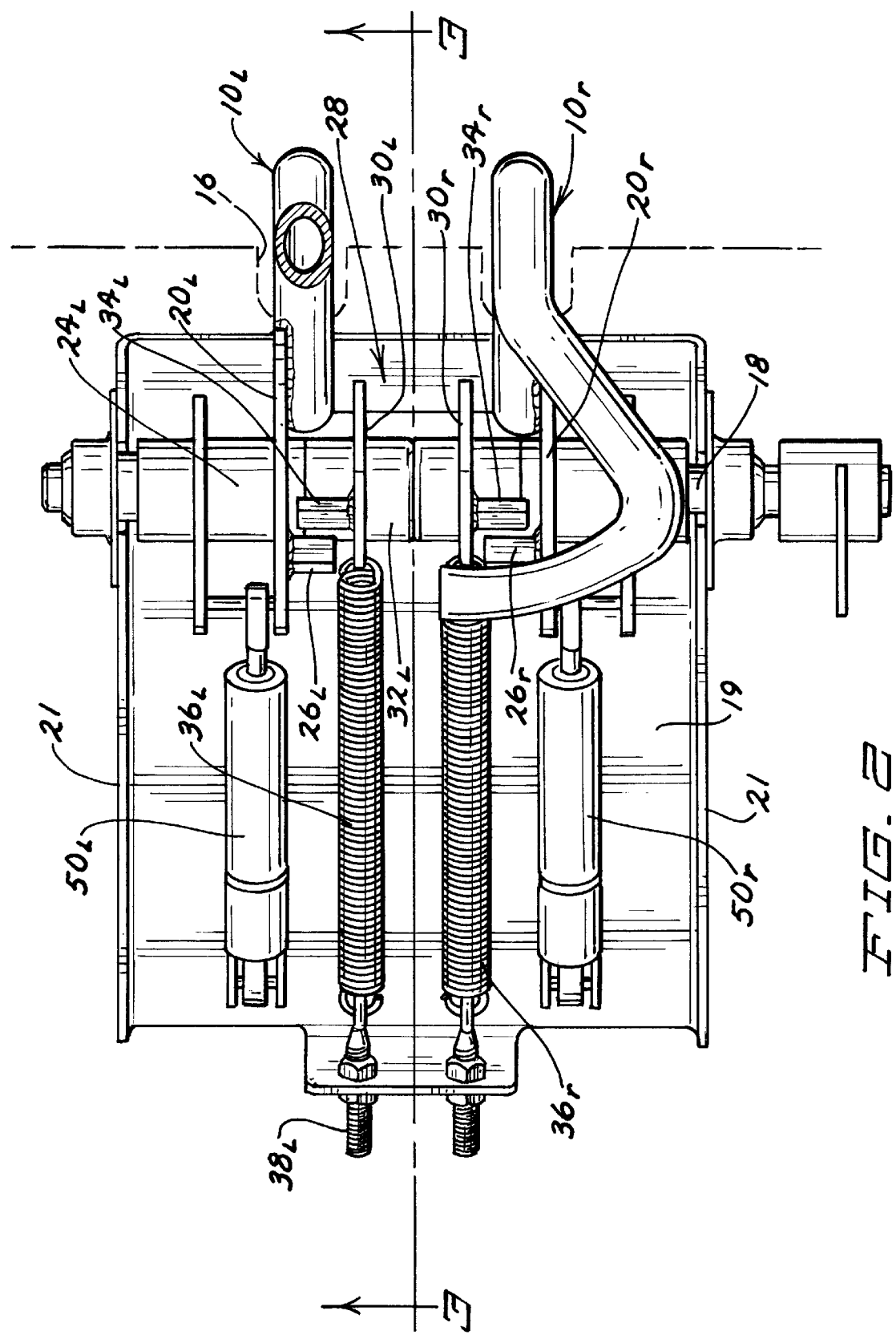
FIG. 2 is a top plan view of the twin stick control system shown in FIG. 1, with an access panel of the mower having been removed to show various components of the control system.
Figure 3:
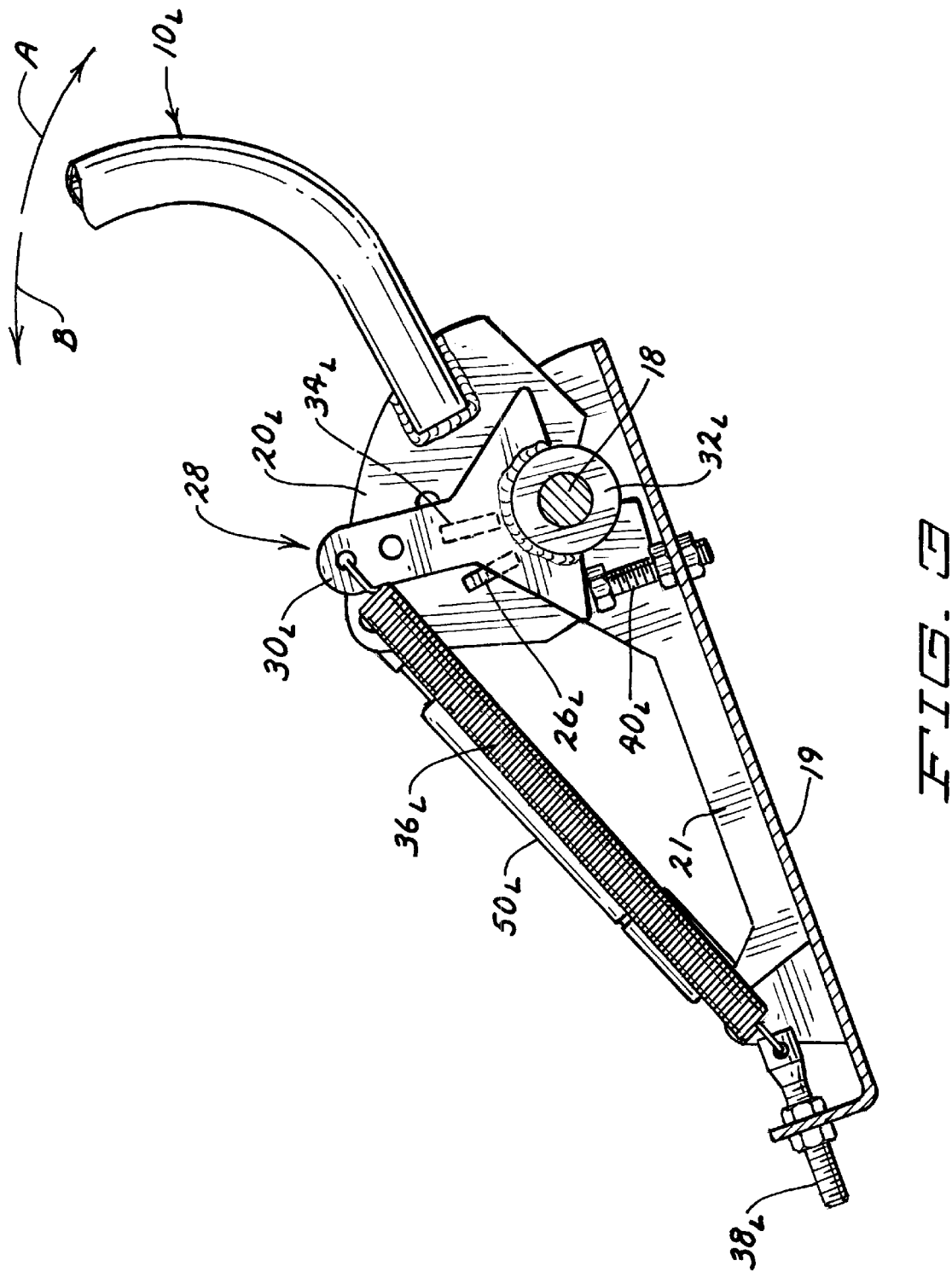
FIG. 3 is a side elevational view of the twin stick control system shown in FIG. 1, with the system shown with the sticks in neutral not having been advanced to the cruise control setting.

Referring now to FIGS. 2 and 3, a lateral pivot shaft 18 is carried on frame 6 beneath access panel 14 shown in FIG. 1. Access panel 14 is not shown in FIGS. 2–5 to better illustrate the remaining portions of frame 6 that support twin stick control system 4 of this invention. Those frame portions comprise a lower support plate 19 having upwardly extending sidewalls 21. Pivot shaft 18 is fixed to sidewalls 21 and extends above lower support plate 19.

The twin stick control system 4 is generally symmetrical with the right side components being identical to the left side components. Accordingly, only one set of components need be described with the understanding that the other components are the same in structure and operation.

Control stick 10 has its lower end welded or otherwise fixedly attached to a control stick plate 20 carried on a first pivotal hub 24. Hub 24 is received on pivot shaft 18 and is rotatable about pivot shaft 18, though one hub 24 can also be fixed to pivot shaft 18 to rotate therewith if so desired with the other hub 24 rotating about pivot shaft 18. Thus, the movement provided for control stick 10 is a pivotal one about the axis of shaft 18. Referring to FIG. 3, movement of control stick 10 in the direction of arrow A comprises rotation about shaft 18 in a clockwise direction while movement in the direction of arrow B comprises rotation about shaft 18 in a counter-clockwise direction. Plate 20 to which control stick 10 is secured has a transversely extending abutment 26, the purpose of which will be described hereafter.

A cruise control system, indicated generally at 28, is provided for establishing a cruise control setting of control stick 10. Cruise control system 28 includes a bell shaped, cruise control plate 30 that is fixedly attached to another pivotal hub 32 that is carried on the lateral pivot shaft 18 adjacent hub 24 that carries control stick 10. Cruise control plate 30 has a stop 34 that extends to one side of cruise control plate 30 into the path of movement of abutment 26 carried on control stick plate 20. Referring to FIGS. 2 and 3, abutment 26 carried on control stick plate 20 is shown spaced from stop 34, but this will not always be the case.

The upper end of cruise control plate 30 is attached to one end of a spring 36. The other end of spring 36 is attached by a mounting bolt 38 to frame 6 of mower 2. Spring 36 is arranged to provide a biasing force tending to resist rotation of plate 30 in a clockwise direction as shown in FIG. 3. Put another way, rotation of cruise control plate 30 in a clockwise direction in FIG. 3, i.e. in the same direction that control stick 10 rotates when control stick 10 is being moved forwardly to accelerate mower 2, is opposed by spring 36. obviously, cruise control plate 30 has no direct effect on control stick 10 until abutment 26 engages against stop 34.

The cruise control setting provided by cruise control plate 30 is selectively adjustable. The lower end of cruise control plate 30 has a flat surface 38 that abuts against the upper end of an adjustable bolt 40. Moving bolt 40 up or down relative to lower support plate 19 will change the orientation of cruise control plate 30 when it is in engagement with bolt 40, the force of spring 36 tending to keep cruise control plate 30 engaged with bolt 40. As shown in FIG. 3, cruise control plate 30 is illustrated with its lower end engaging bolt 40, thereby establishing an initial position for the stop 34 on cruise control plate 30.

While bolt 40 can be adjusted to change the orientation of cruise control plate 30, it cannot be done from the operator's seat while mower 2 is operating. To adjust bolt 40, access panel 14, through which control sticks 10 extend, has to be removed to gain access to the normally hidden components of twin stick control system 4, including access to bolt 40. Alternatively, if a pivotal operator's seat is used on mower 2, the seat could be lifted to get access to bolt 40. Then, tools such as wrenches have to be used to adjust bolt 40. Accordingly, once bolt 40 is set in a particular position in the shop, it cannot be moved by the operator while mowing.

The fact that bolt 40 is normally hidden within mower 2 during operation, and thus is adjustable only in the shop, gives the owner of the equipment the advantage of being able to select whatever cruise control speed is desired and then have some confidence that such selection will not be overridden. For example, bolt 40 can be set so that the cruise control speed would correspond to a relatively safe speed of operation of mower 2, e.g. 3–4 mph or so. The operator cannot reset the cruise control setting higher without disassembling access panel 14 and using tools to turn bolt 40. Thus, the operator cannot defeat the cruise control speed setting without going to much work, and this is unlikely. Accordingly, mower 2 will be operated at whatever cruise control speed has been established by the factory or shop setting of bolt 40.

Figure 5:
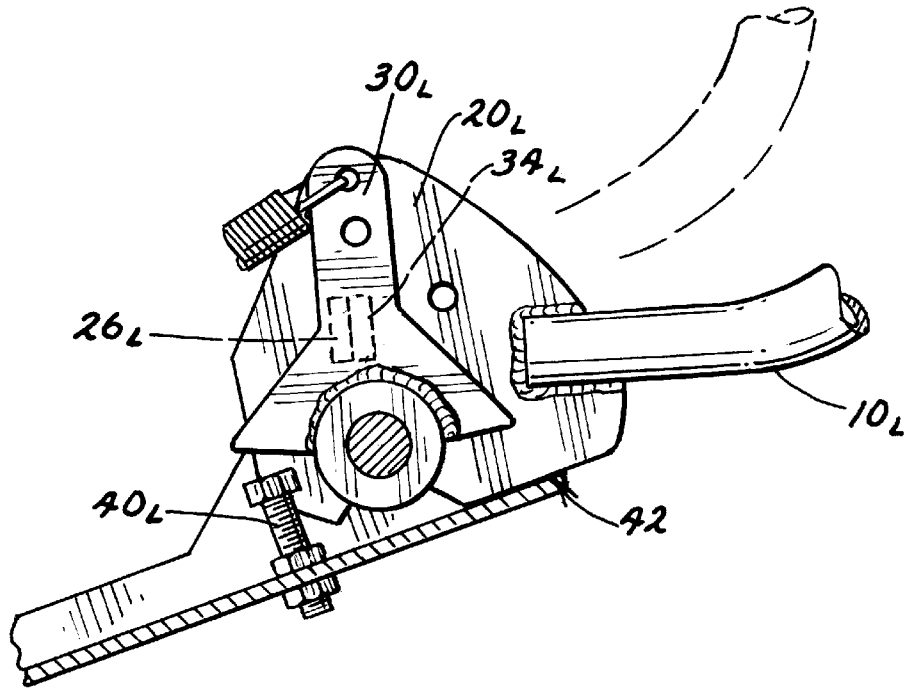
FIG. 5 is a side elevational view of the twin stick control system shown in FIG. 1, with the system shown with the sticks having been temporarily advanced past the cruise control setting.
Figure 4:
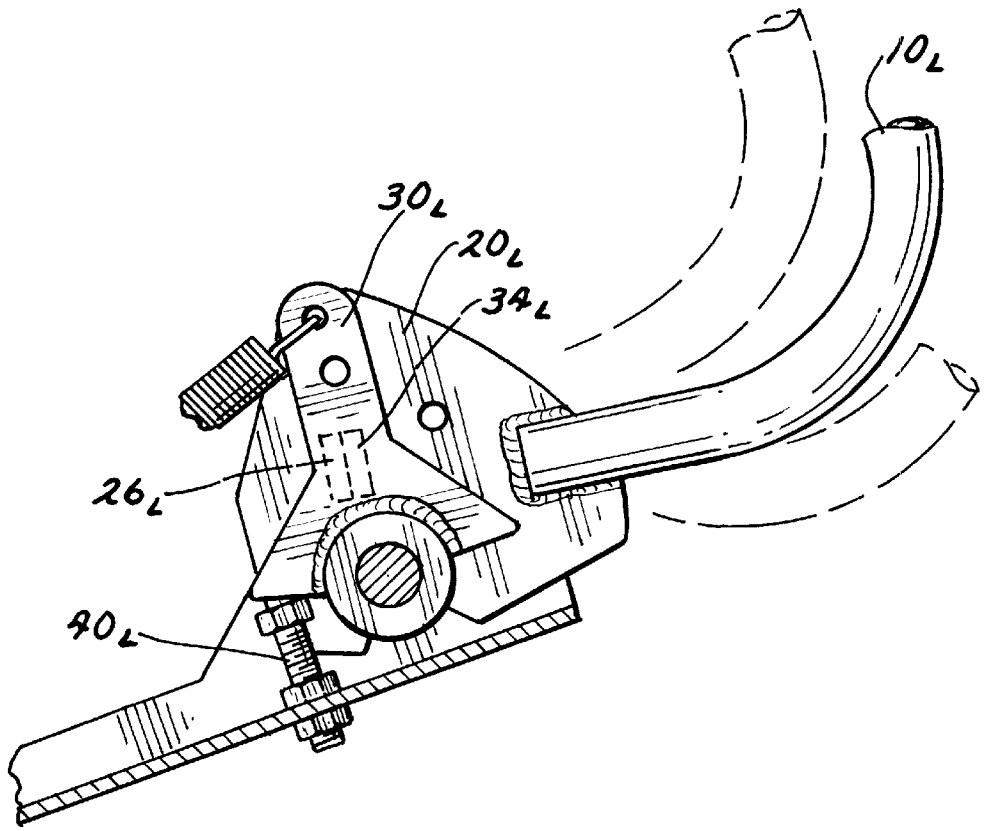
FIG. 4 is a side elevational view of the twin stick control system shown in FIG. 1, with the system shown with the sticks just having been advanced to the cruise control setting.

Referring now to FIGS. 3–5 to better describe the operation of twin stick control system 4 of this invention, control stick 10 as shown in FIG. 3 is in its neutral position where the corresponding drive wheel 8 is stationary. When control stick 10 is rotated clockwise in the direction of arrow A as shown in FIG. 3, forward operation of drive wheel 8 begins with higher speeds being attained by greater amounts of rotation of control stick 10. Eventually, if forward rotation of control stick 10 continues, abutment 26 on control stick plate 20 will approach and then abut against stop 34 on cruise control plate 30. During this initial first range of motion of control stick 10, there is no biasing force, either forwardly or rearwardly, on control stick 10. Control stick 10 will remain in whatever position the operator places it.

When the operator has moved control stick 10 far enough forwardly to engage cruise control plate 30 via the engagement of abutment 26 with stop 34, this can be felt by the operator. In other words, the engagement between abutment 26 on control stick plate 20 and stop 34 on cruise control plate 30 will be communicated back up through control stick 10 to the operator. If the operator merely takes his hand off control stick 10 at this point, with control stick 10 engaging cruise control plate 30 in this manner, the vehicle will be operated at whatever cruise control speed has been set by the position of cruise control plate 30.

However, if the operator wishes to further accelerate mower 2 out of the cruise control speed, he need only advance control stick 10 in a second range of motion past the position at which abutment 26 initially engages stop 34, i.e. past the junction between the first and second ranges of motion of control stick 10. Such an additional advancement will now rotate cruise control plate 30 forwardly with the return biasing force provided by spring 36 progressively increasing. Compare FIG. 5 with FIG. 4. FIG. 4 illustrates the parts in their cruise control position with FIG. 5 illustrating the parts in a condition in which mower 2 has been accelerated to a speed higher than its cruise control speed. In fact, FIG. 5 shows mower 2 at its maximum forward speed since further rotation of control stick 10 in the direction of arrow A is prevented by the engagement of control stick plate 20 with lower support plate 19 shown at 42 in FIG. 5.

Thus, if the operator temporarily speeds up past the cruise control speed, an increasing spring force 36 will now be felt on control stick 10. As soon as the temporary acceleration ends, the operator need only release control stick 10. The force of spring 36 will then return cruise control plate 30 to its initial setting where cruise control plate 30 engages bolt 40. This return motion of cruise control plate 30 also returns control stick 10 back to the cruise control setting. Thus, the operator can easily speed up out of the cruise control setting. Releasing control stick 10 will return it to its cruise control setting without any conscious operator intervention and without having to restore or attempt to restore the cruise control setting.

A pneumatic or hydraulic snubber 50 can be attached between frame 6 and control stick plate 20. Snubber 50 damps or retards the motion of control stick 10 back towards the cruise control position after a temporary acceleration ends. It also prevents the operator from too quickly moving control stick 10 in either direction. However, snubber 50 does not itself move or bias control stick 10 in either direction, but simply damps an operator induced motion or a return motion brought on by the force of spring 36.

Obviously, the above description of the operation of control stick 10 applies to both control sticks $10_r$ and $10_l$ which would normally be operated in tandem to accelerate mower 2 forwardly. If only one stick were operated and not the other, then only drive wheel 8 on one side of mower 2 would be operated, thus effecting a tight turn of mower 2. Thus, the operator's hands, or usually just one of his hands, covers the upper ends of both control sticks 10 to move them forwardly together.

Another advantage of control system 4 of this invention is the ability of the operator to more easily feather control sticks 10 relative to one another when both sticks 10 are in the cruise control position. Then, to make slight adjustments in direction, the operator can nudge one stick forwardly while nudging the other rearwardly. This is easily permitted since cruise control plates 30 do not restrict control sticks 10 from being moved in either direction. In fact, this operation is facilitated in this invention since the detent type feel that is created by abutment 26 engaging stop 34 and that is communicated to the operator through control sticks 10 when they are in their cruise control position serves as a base or reference point about which the two sticks can be nudged forwardly or rearwardly as needed.

Various modifications of this invention will be apparent to those skilled in the art. While separate cruise control plates 30$_r$ and 30$_l$ have been shown, it would be possible to use only a single cruise control plate 30 as long as one or more stops 34 are still in the path of movement of the abutments 26. In addition, while control system 4 has been shown in conjunction with a riding vehicle, it would also be applicable to various other movable units known in the lawn and garden industry in which the operator walks behind the unit, such as wide area mowers. Thus, the scope of this invention is to be limited only by the appended claims.

We claim:

1. A movable unit, which comprises:
   a frame supported for movement over the around by a plurality of around engaging wheels including a powered drive wheel;
   a control member carried on the frame of the movable unit capable of being selectively manipulated by an operator, the control member having a neutral position in which the drive wheel is at rest, the control member being pivotally movable on the frame for pivotal movement about only a single pivot axis, the control member being pivotally movable out of the neutral position in a first forward direction relative to the frame to cause the drive wheel to rotate in a forward direction to move the frame of the movable unit forwardly;
   the control member being movable in the first forward direction in a first range of motion with the control member being configured to remain wherever it is placed by the operator within the first range of motion even when the operator releases the control member; and
   the control member being movable in the first forward direction in a second range of motion following the first range of motion, the movement of the control member in the second range of motion being opposed by a biasing device tending to return the control member towards a junction between the first and second ranges of motion, whereby the junction between the first and second ranges of motion sets a cruise control speed to which the control member is automatically returned by the biasing device if the operator releases the control member within the second range of motion.

2. The movable unit of claim 1, wherein the junction between the first and second ranges of motion is adjustable to establish different cruise control speeds.

3. The movable unit of claim 2, wherein the junction adjustment is not accessible to the operator during operation of the movable unit.

4. The movable unit of claim 3, wherein the junction adjustment is hidden beneath a panel of the movable unit that must be removed to gain access to the junction adjustment.

5. The movable unit of claim 1, wherein the control member is a pivotal control stick.

6. The movable unit of claim 5, wherein twin control sticks are provided to independently control at least one drive wheel provided on each side of the movable unit.

7. The movable unit of claim 6, wherein the movable unit comprises a vehicle.

8. The movable unit of claim 6, wherein the movable unit comprises an outdoor power equipment unit.

9. The movable unit of claim 8, wherein the movable unit comprises a riding lawn mower.

10. A movable unit, which comprises:
    a frame supported for movement over the ground by a plurality of ground engaging wheels including a powered drive wheel;
    a control member movably carried on the frame of the movable unit, the control member being operably coupled to the drive wheel;
    an abutment fixed to the control member for movement therewith;
    a stop movably carried on the movable unit and extending into the path of motion of the abutment on the control member, the stop having an initial position that is spaced from the abutment when the control member is in a neutral position with the drive wheel at rest;
    a spring connected to the stop such that movement of the control member forwardly from its neutral position is not initially opposed by the spring until the abutment engages the stop with continued movement of the control member then serving to move the stop against the bias of the spring; and
    wherein movement of the control member out of its neutral position is effective to cause operation of the drive wheel both before and after the abutment engages the stop.

11. The movable unit of claim 10, wherein the initial position of the stop is adjustable to vary how much the stop is spaced from the abutment when the control member is in the neutral position.

12. The movable unit of claim 10, wherein the stop is carried on a movable plate, and wherein the spring extends between the movable plate and a frame portion of the movable unit.

13. The movable unit of claim 10, wherein the control member and stop are pivotally carried on the movable unit.

14. The movable unit of claim 10, wherein twin control members are provided to independently control at least one drive wheel provided on each side of the movable unit.

15. The movable unit of claim 14, wherein the movable unit comprises a riding lawn mower.

16. A movable unit, which comprises:
    (a) a frame supported for movement over the ground by a plurality of ground engaging wheels, the frame having at least one drive wheel on both the left and right sides thereof with the left drive wheel(s) being operable independently from the right drive wheel(s), the frame having left and right control sticks pivotally carried on the frame, the left control stick being operably coupled to the drive wheel(s) on the left side of the movable unit to operate such drive wheel(s) and the right control stick being operably coupled to the drive wheel(s) on the right side of the movable unit to operate such right side drive wheel(s);

(b) an abutment fixed to each of the left and right control sticks to rotate therewith;

(c) at least one stop pivotally carried on the movable unit and extending into the path of movement of the abutments carried on the left and right control sticks;

(d) at least one spring connected to the stop(s) for biasing the stop(s) back towards a neutral position of the control sticks; and (e) wherein the stop(s) are spaced away from the abutments in the neutral position of the control sticks to thereby establish a cruise control speed setting, whereby the control sticks may be advanced out of neutral and brought forwardly until the abutments on the control sticks engage the stop(s) at which point the cruise control speed setting has been reached by the control sticks, the control sticks capable of being further advanced out of the cruise control speed setting simply by further forward motion of the control sticks thereby pushing forwardly on the stop(s) to rotate the stop(s) against the force of the spring(s), the force of the spring(s) acting to return the stop(s) and the control sticks to the cruise control speed setting when the control sticks are released by the operator, and wherein the control sticks are effective to operate the left and right drive wheel(s) when the control sticks are advanced out of neutral both before and after the abutments engage the stop(s).

17. The movable unit of claim 16, wherein two stops are provided with each stop being engaged by one abutment.

18. The movable unit of claim 17, wherein two springs are provided with one spring being connected to each stop.

19. The movable unit of claim 16, further including at least one adjustable device that spaces the stop(s) away from the abutments to be able to vary the cruise control speed setting.

* * * * *

UNITED STATES PATENT AND TRADEMARK OFFICE
CERTIFICATE OF CORRECTION

PATENT NO. : 6,161,637
DATED : December 19, 2000
INVENTOR(S) : Matthew J. Decker et al.

It is certified that error appears in the above-identified patent and that said Letters Patent is hereby corrected as shown below:

Column 7, claim 1,
Lines 32 and 33, "around" should read -- ground --.

Signed and Sealed this

Twenty-fifth Day of September, 2001

Attest:

NICHOLAS P. GODICI
*Acting Director of the United States Patent and Trademark Office*

*Attesting Officer*